Nov. 16, 1948.  R. E. COX  2,454,039
HIGH-FREQUENCY INDUCTION HEATING APPARATUS
Filed June 28, 1947  3 Sheets-Sheet 2
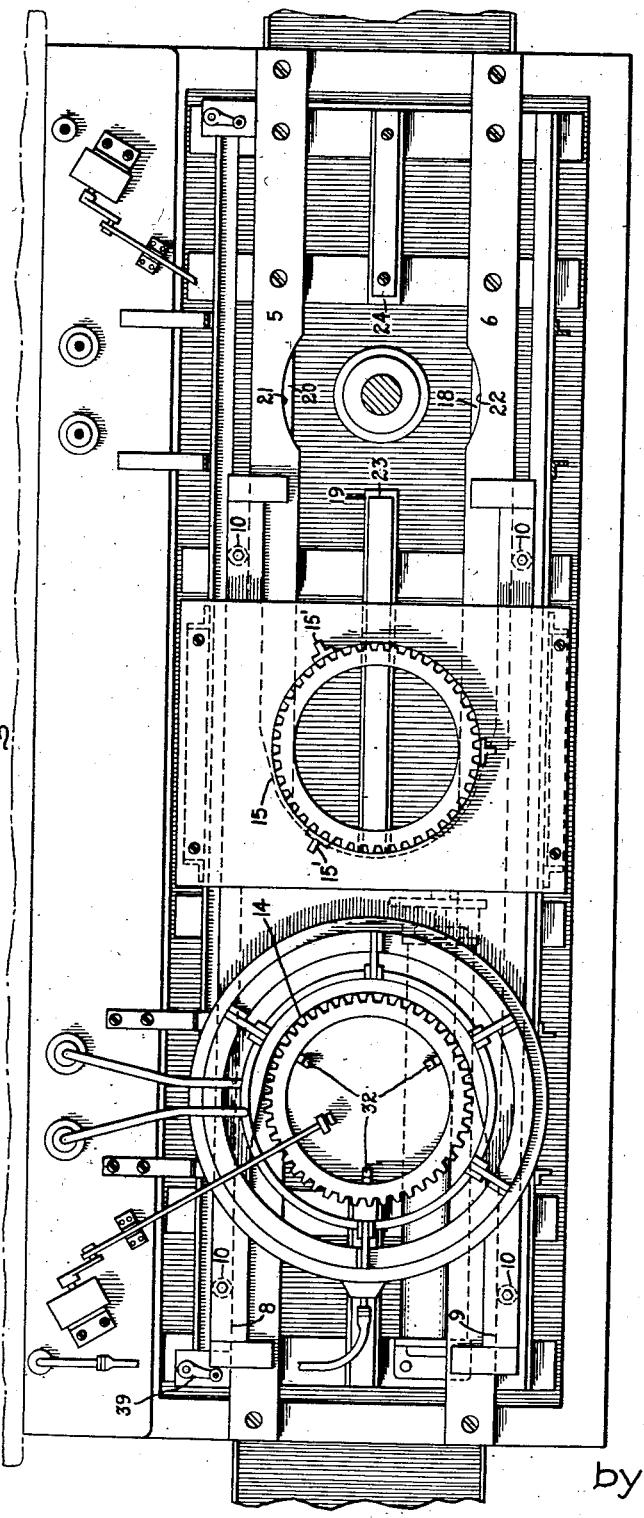
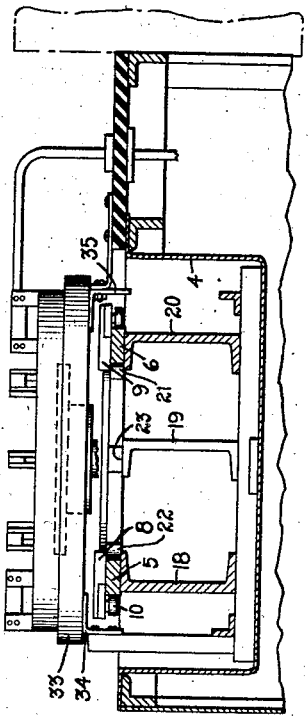
Inventor:
Ralph E. Cox,
by *Claude A. Mott*
His Attorney.

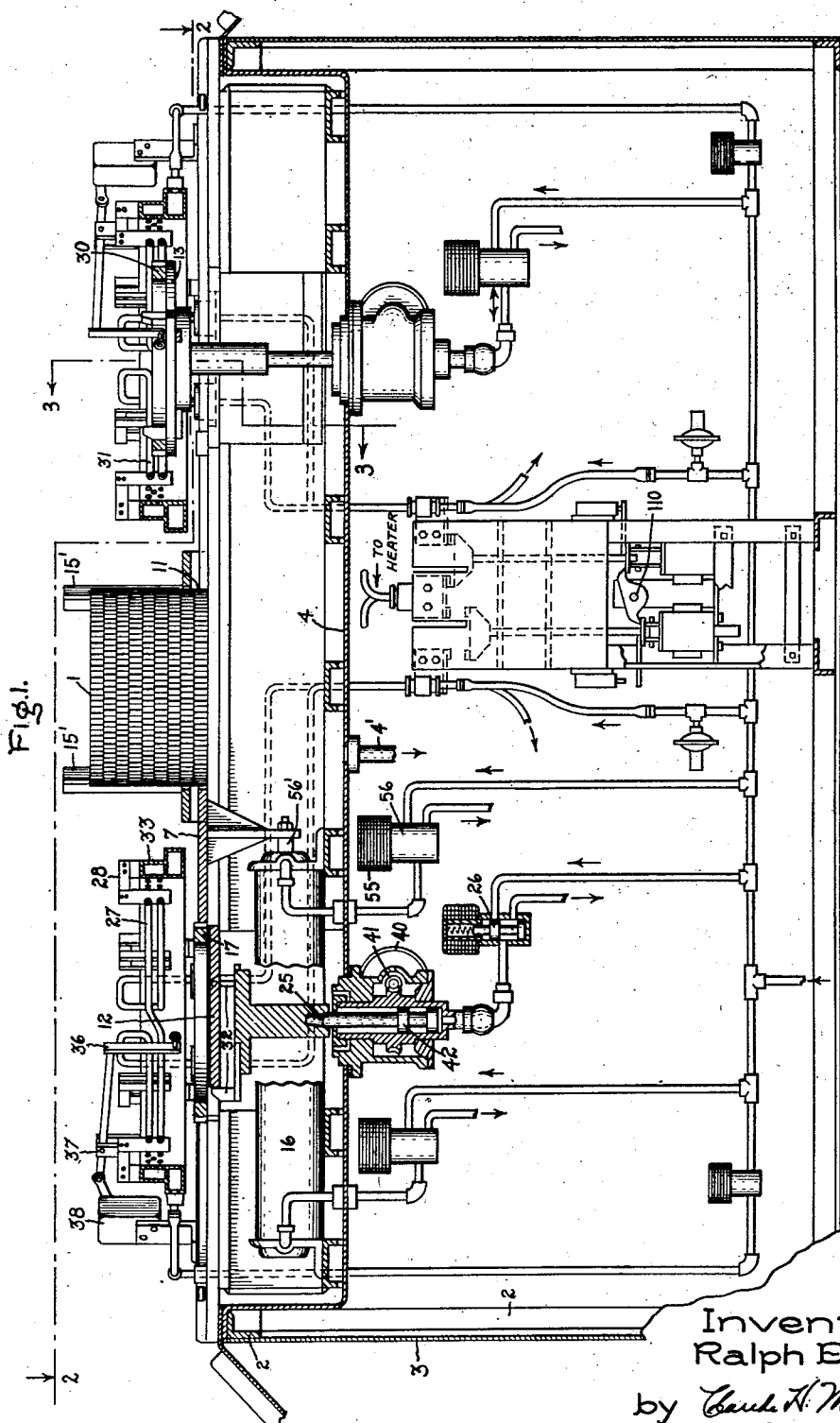

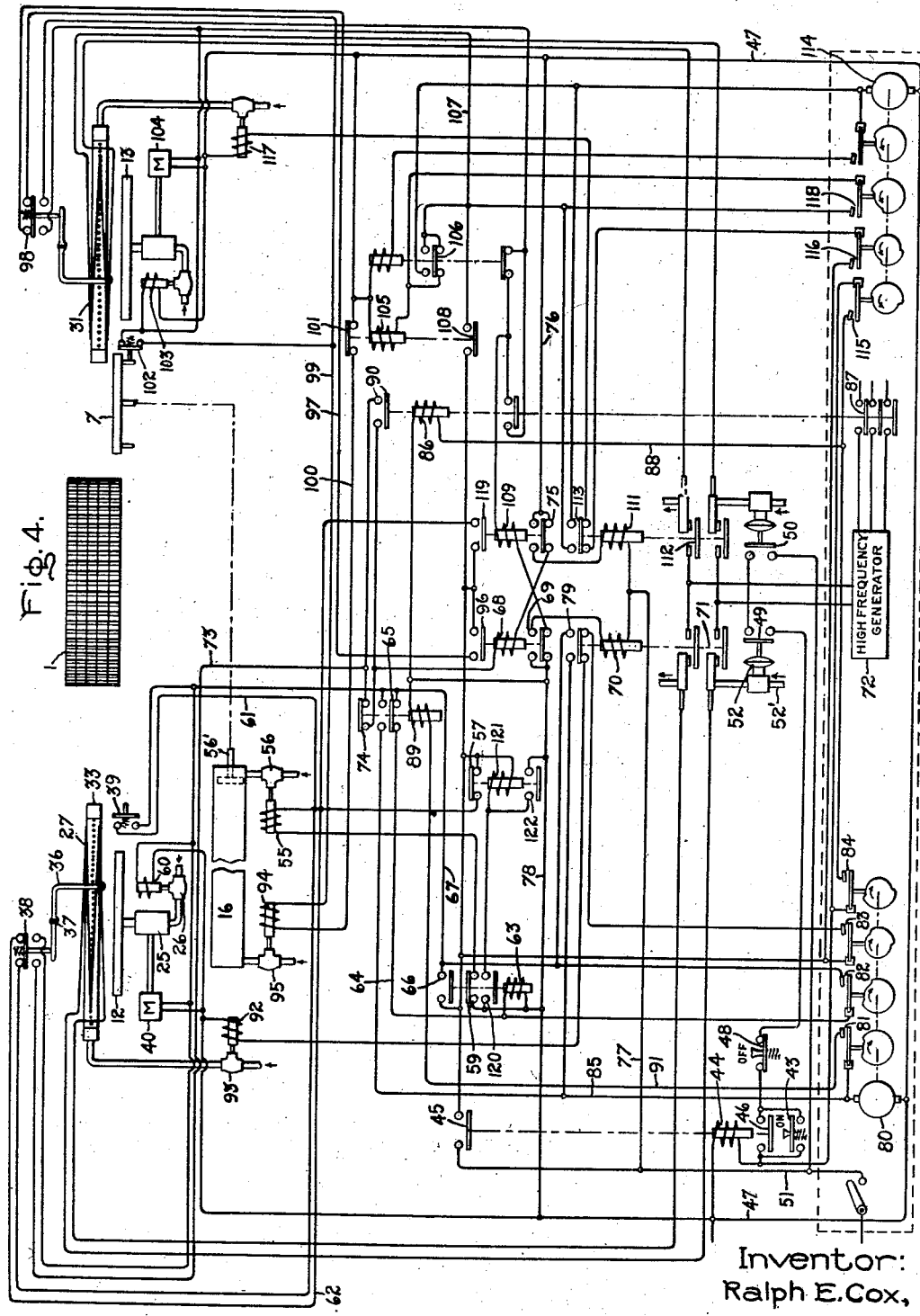

Patented Nov. 16, 1948

2,454,039

UNITED STATES PATENT OFFICE 2,454,039

HIGH-FREQUENCY INDUCTION HEATING APPARATUS

Ralph E. Cox, Schenectady, N. Y., assignor to General Electric Company, a corporation of New York Application June 28, 1947, Serial No. 757,884

10 Claims. (Cl. 219—47)

My invention relates to high frequency induction heating apparatus for heating articles, such as gears and the like, for hardening purposes, and has for its object a completely automatic heater wherein the gears or other parts to be heated are moved separately to a heating position and then heated and discharged from the device.

In carrying out my invention in one form I provide a supporting structure provided with a horizontal rack or table at the top. In the table are mounted in spaced relation with each other two gear supports by means of which a gear is elevated to heating position with respect to a high frequency heating coil just above the support. Between the work supports on the table are provided supporting means for a stack of untreated gears, together with a pusher slidable on the table for pushing the lowermost gear of the stack onto one or the other of the work supports. Suitable driving motors are provided for the work supports and the pusher, together with automatic control means for causing the gears to be pushed one by one off the bottom of the stack alternately onto the supports where they are heated.

For a more complete understanding of my invention reference should be had to the accompanying drawing, Fig. 1 of which is a sectional elevation view of the high frequency heating apparatus embodying my invention, Fig. 2 is a plan view partly in section of the heating apparatus shown in Fig. 1, Fig. 3 is a view mainly in section taken along the line 3—3 of Fig. 1 looking in the direction of the arrows, while Fig. 4 is a diagrammatic view showing various parts of the heating apparatus with associated control circuits.

Referring to the drawing, I have shown my invention in one form as applied to the automatic heating and quenching for hardening purposes of a stack of ring gears 1, Fig. 1. The heating equipment is mounted on a suitable supporting structure which is rectangular in outline, as shown in Fig. 2. This structure is formed by suitable angle iron supports 2 and is enclosed by sheet metal side walls 3. At the top of this supporting structure a suitable metal tank 4 is provided in which the quenching water is collected and carried away through a drain pipe 4'.

Extending lengthwise of the tank 4 are two metal supporting and guide bars 5 and 6 which are parallel with each other and act as guides for a pusher member or plate 7 sliding on the bars and connected at its ends to parallel carriage bars 8 and 9, each of which is provided with a plurality of rollers 10 engaging the outside edges of the guide bars 5 and 6 so as to hold the pusher in a predetermined transverse relation with guide bars 5 and 6 while permitting longitudinal movement of the pusher.

The pusher 7 serves the purpose of engaging the lowermost gear 11 of the stack and pushing the gear in one direction or the other onto a work supporting disk or plate 12 or 13 supported on the table with its upper surface substantially flush with the upper surface of the bars 5 and 6. Pusher 7 is provided with opposite curved edges 14 and 15, Fig. 2, the curvatures of which are only slightly greater than the curvature of the gears so that a straight line movement of the gear in a predetermined transverse relation with the pusher is assured. The stack of gears is secured midway between the disks 12 and 13 by means of vertical holding posts 15'.

As seen in Fig. 1, the pusher 7 has been moved to its lefthand position by means of the hydraulic plunger type driving motor 16 connected thereto and has pushed a gear 17 onto the supporting plate 12. It will be noted that the pusher 7 as seen in Figs. 1 and 2 has moved completely under the stack of gears to the lefthand side of the stack of gears and the holding means 15' so that the remaining gears in the stack have moved downward to bring the lowermost gear 11 on the righthand side of the pusher in position to be engaged by the pusher when the pusher moves toward the right hand. It will be noted that the plate 12 rests on the sides and ends of the channel bar supports 18, 19 and 20 which are mounted in the tank 4. As shown in Fig. 2, the bars 5 and 6 have circular portions cut away at points 21 and 22 to allow the circular table 13 to rest on the channel bars 18 and 20. The channel bar 19 is broken with its spaced ends in position to provide ledges 23 and 24 on which the supporting plate 13 rests. A similar arrangement is provided for the supporting plate 12.

When the gear 17 is in position as shown in Fig. 1 a hydraulic plunger motor 25 is operated by actuating a valve 26 whereby the supporting disk 12 and the gear 17 are raised to a position inside of a helical high frequency heating coil 27 mounted on a suitable bracket 28 above the supporting disk 12. This heating position is shown in Fig. 1 with respect to the supporting disk 13 and a gear 30 which is in heating position with respect to a high frequency heating coil 31 mounted above the supporting disk 13.

For the purpose of securing the gear in concentric relation with the hydraulic elevating motor 25 and the heating coil, the plunger operating member of the motor is provided with three projections 32, Fig. 2, which move upward through holes provided for them in the supporting disk 12 into closely spaced relation with the inside wall of the gear 17. It will be noted that the heating coil 27 is mounted on a quench ring 33 which in turn, as shown in Fig. 3, is supported on brackets 34 and 35. This quench ring is of the type described and claimed in U. S. application Serial No. 704,946, filed on October 22, 1946, by Herbert W. Secor, assigned to the same assignee as this invention.

As the disk 12 and gear 17 are elevated the disk engages an arm 36 pushing it in a counter-clockwise direction about its pivot 37 thereby to operate a limit switch 38 by means of which the supply of current to the heating coil 27 is controlled. Also, the carriage bar 8 in moving to its lefthand position as seen in Fig. 2 operates a limit switch 39 for the control of the heating operation.

During the heating operation the gear is rotated to assure uniform heating by means of an electric motor 40 connected through a worm gear drive 41 to a rotatably mounted cylinder 42 of the hydraulic motor 25.

The sequence of operations carried out automatically by the heater may be outlined as follows, beginning with the parts in the positions shown in Fig. 4. To start the heater a button 43 is pressed, after which all operations are performed automatically utilizing first one heating coil and then the other until the heater is stopped by pressing an "off" button 48. The hydraulic motor 16 is first operated to move the pusher 7 toward the left to push a gear on the supporting disk 12 which is then elevated by the motor 25 to a heating position and the motor 40 started to rotate the gear. The disk 12 in moving to its heating position operates the limit switch 38 to its lower position whereby connections are made for the supply of current to the heating coil 27 through a switch 71 to carry out the heating operation. Also at this time the motor 16 is operated to move the pusher to its righthand position to push a gear on the disk 13 which is then elevated to a heating position. The disk 13 operates its limit switch 98 to a lowermost position whereby circuits are closed for the connection of the heating coil 31 to the high frequency generator by means of a switch 112 as soon as the switch 71 has been opened to deenergize the heating coil 27.

Sequence control of the heating operations is obtained by means of timer motors 80 and 114 driving time switches for the control of the two heating operations. After the completion of the heating of each gear water is supplied to the quench ring for quenching and then the gear is lowered to the table. When the pusher 7 is next operated to push an untreated gear into heating position this gear pushes a previously hardened gear along the table and, eventually, into a receiving chute provided at each end of the table.

The various control circuits will now be traced with reference to Fig. 4. In Fig. 4 all devices are shown deenergized, both supporting disks 12 and 13 in their lowermost positions, and the pusher 7 in its righthand position. The apparatus is started by pressing an "on" or "start" button 43 whereby a circuit is closed for the coil 44 which thereupon closes the switch 45 and its holding switch 46.

The circuit for the coil 44 is traced from the supply main 47 through the coil, the switch 43, "off" switch 48, the two pressure switches 49 and 50 which are closed, back to the supply main 51. The pressure switch 49 is operated to its closed position by a diaphragm operating device 52 connected to the cooling water supply pipe 52' for the heating coil 27, while the switch 50 is held closed by the cooling water pressure for the heating coil 31. Therefore, the cooling water supply for both heating coils must be turned on by a suitable valve (not shown) so that these switches are closed before the heater can be operated.

The switch 45 closes a circuit for an operating coil 55 which opens a hydraulic valve 56 whereby fluid under pressure is admitted to the righthand end of the hydraulic motor 16 and its plunger 56' thereby moved toward the left hand whereby the pusher 7 connected to the plunger is moved toward the left hand as seen in Fig. 4 and the lowermost gear of the stack pushed onto the supporting disk 12. The circuit for the coil 55 leads from supply main 51 through switch 45, switch 57, coil 55, and switch 59 to the supply main 47.

In moving to this lefthand position the pusher 7 closes the limit switch 39 which energizes the motor 40 for rotating the gear and a coil 60 which opens the valve 26 for operation of the hydraulic motor 25 to raise the disk 12 and the gear to a heating position inside the coil 27. This circuit may be traced from supply main 47 through the motor 40 and the coil 60 in parallel with each other, the switch 39, conductor 61, the limit switch 38 then in its uppermost closed position, conductor 62, switch 57 and switch 45 to the supply main 51. Also, the closure of the limit switch 39 closes a circuit for the coil 63 which opens the switch 59 to deenergize the coil 55 whereby the valve 56 is operated in accordance with its bias to exhaust liquid from the motor 16 ready for the reverse operation of the pusher. The circuit for the coil 63 leads from the supply main 47 through the coil, conductor 64, switch 65 and limit switch 39, limit switch 38, switch 57 and the switch 45 to the main 51.

Coil 63 also closes a switch 66 which closes the circuit for the motor 40 and coil 60 in parallel with the switches 39, 38 and 57, which may now be opened. The circuit for the motor 40 and the coil 60 is now from the supply main 51, through the switch 45, switch 66, conductor 67, and through the motor 40 and coil 60 in parallel with each other to the supply main 47.

When the work-supporting disk 12 reaches its heating position it operates the lever 36 to move the limit switch 38 to its lowermost closed position which energizes the coil 68 and moves the switch 69 to its upper closed position for the energization of the coil 70 and closure of the double pole switch 71 connecting the heating coil 27 to the high frequency electronic oscillator generator 72. The circuit for the coil 68 leads from main 51 through switch 45, switch 66, conductor 67, switch 38 in its lower position, conductor 73, switch 74, coil 68, switch 75, conductor 76 to the supply main 47. The circuit for the coil 70 leads from the supply main 51 through conductor 77, coil 70, upper switch 69 and conductor 78 to the supply main 47.

The coil 70 also closes its upper switch 79 thereby closing a circuit for the timer motor 80 which drives a plurality of cams operating biased open switches 81, 82, 83 and 84. The circuit for the motor 80 leads from supply main 51 through the switch 45, switch 66, upper switch 79, conductor 85 and the motor 80 to the supply main

47. Immediately thereafter the timer switch 84 is closed whereby the coil 86 is energized and closes a switch 87 to apply low frequency three phase supply voltage to the electric discharge device oscillator generator 72. Preferably the cathodes of the discharge devices are maintained heated by a separate supply source (not shown). High frequency current is now supplied to the heating coil 27 and the gear is heated very quickly to the hardening temperature. The circuit for the coil 86 leads from the main 47 through the conductor 78, coil 86, conductor 88, switch 84, switches 46, 48, 49 and 50, to the supply main 51.

Soon after the closing of the switch 84, the timer motor 80 closes the switch 81 which closes a circuit for the coil 89 for the operation of its switch 65 to its upper position and the opening of its switch 74. The opening of the switch 74 does not deenergize the coil 68 because of the fact that this circuit is maintained by the switch 90 held closed by the coil 86. The circuit of the coil 89 may be traced from the supply main 51, switch 45, switch 66, upper switch 79, conductor 85, time switch 81, conductor 91, coil 89, and conductor 78 to the supply main 47.

The opening of the lower switch 65 by the coil 89 transfers the circuit for the coil 63 to the time switch 82 which is now closed and which is in parallel with the lower switch 65. The closing of the upper switch 65 also establishes a holding circuit for the coil 89 and for the timer motor 80 in parallel with the upper switch 79 with which the upper switch 65 is connected in parallel.

After a predetermined heating time during which the gear is heated to a desired hardening temperature the time switch 84 is opened for deenergization of the coil 86 whereby the switches 87 and 90 open in accordance with their biases. The opening of the switch 87 removes the supply voltage from the generator and cuts off the supply of heating current to the heating coil, while the opening of the switch 90 deenergizes the coil 68 whereby the upper switch 69 opens to deenergize the coil 70 and open the switch 71 to disconnect the heating coil from the generator.

Immediately after the opening of the time switch 84 the time switch 83 is closed for a predetermined quenching time interval to energize a solenoid 92 which opens a valve 93 for a supply of quenching fluid to the quenching ring 33 whereby the gear is quenched. The circuit of the coil 92 may be traced from the supply main 47 through the coil, lower switch 79, the switch 83, and the switch 45 to the supply main 51.

Simultaneously with the opening of the switch 83 to stop quenching, the time switch 82 opens to deenergize the coil 63 and thereby reset all of the control relays for the heating operation performed by the coil 27.

When the coil 68 is energized, as previously described, the coil 94 is energized to open the valve 95 whereby the hydraulic motor 16 is operated to move the pusher 7 to its righthand position as shown in Fig. 4, whereby a gear is pushed onto the supporting plate 13. The circuit for the coil 94 leads from supply main 51 through the switch 45, the switch 96 which was closed by the coil 68, conductor 97, limit switch 98 in its upper position, conductor 99, coil 94, conductor 100, switch 101 to the supply main 47.

The sequence with respect to the gear on the disk 13 is the same as previously described with respect to the supporting disk 12 and will be described briefly. When the pusher 7 closes its limit switch 102 after a gear has been pushed on the supporting disk 13, the coil 103 is energized to elevate the gear into the heating coil 31, and the motor 104 is energized to rotate the gear.

Also the switch 102 closes the circuit of the coil 105 leading from the supply main 47 through the coil 105, the switch 106, conductor 107, limit switch 102, upper limit switch 98, conductor 97, switch 96, and switch 45 to the supply main 51.

The opening the switch 101 by the coil 105 deenergizes the coil 94 so that the valve 93 moves to its liquid exhaust position in accordance with its bias. A holding circuit for the coil 103 and the motor 104 is established by the closure of the switch 108 by the coil 105, this holding circuit being in parallel with the switch 96, switch 98 in its upper position, and the switch 101.

When the limit switch 98 is thrown to its lower position by the elevation of a gear into the heating coil 31 the switch 98 closes a circuit for a coil 109 which picks up its armature as soon as the coil 68 is deenergized as previously described and releases its armature. The armatures of the coils 68 and 109 are connected together by a pivoted lever mechanical interlock 110, Fig. 1, which when one armature is picked up prevents the other armature from being picked up even though its coil is energized. At about this time, however, i. e., when a gear is in heating position with respect to the coil 31, the heating and quenching of the gear in the coil 27 is completed and the coil 68 is deenergized as previously described. When the coil 109 picks up its armature it closes its upper switch 75 to energize a coil 111 which in turn closes a switch 112 to connect the heating coil 31 to the generator 72. A switch 113 is moved to its upper position by the coil 111 thereby to establish a circuit for the timer motor 114 which closes its switch 115 to energize the coil 86 and close the switch 87 to supply input voltage to the generator. After a predetermined heating period the switch 115 opens to deenergize the coil 86 and terminate the heating operation. Thereafter, the time switch 116 closes to energize the quench coil 117 for the quenching period after which the switch 116 is opened. Upon the completion of the quenching the time switch 118 opens to deenergize the coil 105 and reset the controls for heating by means of the heating coil 31.

When the coil 109 is energized it closes a switch 119 in series with lower limit switch 38 in the circuit of the coil 55 whereby when the lower switch 38 is closed by the lowering of the disk 12 the motor 16 is operated to move the pusher 7 to its lefthand position and repeat the heating operation by means of the heating coil 27 as previously described.

The switch 57 provides for energization of the coil at the start before the switch 119 has been closed. When the switch 120 is closed it energizes a coil 121 which opens the switch 57 and closes a switch 122 to establish a holding circuit for the coil 121 so that the switch 57 remains open until the heater is stopped by the push-button switch 48. With the switch 57 open, the hydraulic motor coil 55 can be energized only by the closing of the switch 119 which is in parallel with the switch 57. Moreover, the switch 59, operated by the coil 63, must be closed by the opening of the time switch 82 in order that the coil 55 be energized.

When the coil 63 is deenergized at the end of the quenching operation by the opening of the timer switch 82, the motor 40 and the coil 60 are deenergized by the opening of the switch 66 whereby the motor stops and the valve 26 moves in accordance with its bias to its exhaust position whereby the supporting disk and treated gear thereon are lowered to the table. The support 12 must be completely lowered so as to close the limit switch 38 in its upper position in order to permit the energization of the valve coil 55 of the motor 16 to cause movement of the pusher 7 to its lefthand position.

It will be understood that my invention is useful in the heating of articles made of dielectric material such as a cellulose material in which case suitable heating means, such as spaced electrodes, will be provided for producing an electric field in which the article will be heated.

What I claim as new and desire to secure by Letters Patent of the United States is:

1. Electric high frequency heating apparatus comprising a supporting structure, two upwardly movable work supports mounted on said structure in spaced relation with each other, article holding means for securing a plurality of articles to be heated in substantially vertical stacked relation midway between said work supports and arranged to provide for downward feeding movement of the stack of articles, a pusher movable between said work supports from one side to the other of said article holding means to engage and move the then lowermost one of said articles alternately onto said work supports, operating means for said pusher, high frequency electric heating means mounted above each of said work supports, operating means for elevating each of said work supports to bring an article into heating relation with its heating means, current supply means for said heating means, and switching means for connecting said current supply means to one or the other of said heating means.

2. High frequency induction heating apparatus comprising a supporting structure, two upwardly movable work supports mounted on said structure in spaced relation with each other, article holding means on said structure for securing a substantially vertical stack of articles to be heated midway between said work supports and arranged to provide for downward feeding movement of the stack of articles, a pusher movable between said work supports from one side to the other of said article holding means to engage and move the then lowermost one of said articles alternately onto said work supports, operating means for said pusher, a high frequency induction heating means mounted above each of said work supports, operating means for elevating each of said work supports to bring an article into heating relation with its heating means, a high frequency generator for supplying current to said heating means, and switching means for connecting said generator to one or the other of said heating means.

3. High frequency induction heating apparatus comprising a supporting structure provided with a substantially horizontal top forming a table, two upwardly movable work supports mounted on said structure in spaced relation with each other having their upper surfaces substantially flush with the top of said table, article holding means on said table for securing a substantially vertical stack of articles to be heated midway between said work supports and arranged to provide for downward feeding movement of the stack of articles, a pusher slidable on said table between said work supports from one side to the other of said article holding means to engage and push the then lowermost one of said articles alternately onto said work supports, operating means for said pusher, a high frequency induction heating coil mounted above each of said work supports, operating means for elevating each of said work supports to bring an article into heating relation with its heating coil, a high frequency generator for supplying current to said heating coils, and switching means for connecting said generator to one or the other of said coils.

4. High frequency induction heating apparatus comprising a supporting structure provided with a substantially horizontal top forming a table, two upwardly movable work supports mounted on said structure in spaced relation with each other having their upper surfaces substantially flush with the top of said table, article holding means on said table for securing a substantially vertical stack of articles to be heated substantially midway between said work supports and arranged to provide for downward feeding movement of the stack of articles, a pusher slidable on said table between said supports from one side to the other of said article holding means to engage and push the then lowermost one of the articles alternately onto said work supports, operating means for said pusher, a high frequency induction heating coil mounted above each of said work supports, operating means for elevating each of said work supports to bring an article carried by it into heating relation with its heating coil, a high frequency generator for supplying current to said heating coils, and limit switches operated by said pusher and said work supports for controlling said operating means and said heating coils so as to heat articles alternately in said heating coils.

5. High frequency electric heating apparatus comprising a supporting structure provided with a substantially horizontal top forming a table, two upwardly movable work supports mounted on said structure in spaced relation with each other having their upper surfaces substantially flush with the top of said table, article holding means on said table for securing a substantially vertical stack of articles to be heated substantially midway between said work supports and arranged to provide for downward feeding movement of the stack of articles, a pusher slidable on said table between said supports from one side to the other of said article holding means to engage and push the then lowermost one of the articles alternately onto said work supports, a first operating means for said pusher, a high frequency heating coil mounted above each of said work supports, a second operating means for elevating each of said work supports to bring an article carried by it into heating relation with its heating coil, a high frequency generator for supplying current to said heating coils, limit switches operated by said pusher and by each of said work supports for controlling said operating means so as to cause said operating means to effect the operation of said pusher after the work support toward which it is moved is in its lower position and for elevation of each of said work supports after said pusher is moved to a position adjacent said support.

6. High frequency electric heating apparatus comprising a supporting structure provided with a substantially horizontal top forming a table, two upwardly movable work supports mounted on said structure in spaced relation with each other having their upper surfaces substantially flush with the top of said table, article holding means on said table for securing a substantially vertical stack of articles to be heated substantially midway between said work supports and arranged to provide for downward feeding movement of the stack of articles, a pusher slidable on said table between said supports from one side to the other of said article holding means to engage and push the then lowermost one of said articles alternately onto said work supports, operating means for said pusher, a high frequency heating coil mounted above each of said work supports, operating means for elevating each of said work supports to bring an article carried by it into heating relation with the corresponding heating coil, a high frequency generator for supplying current to said heating coils, limit switches operated by said pusher and by said work supports for controlling said operating means so as to cause said operating means to effect the operation of said pusher after the work support toward which it is moved is in its lower position and for elevation of each of said work supports after said pusher is moved to a position adjacent said support, switching means for connecting each of said heating coils to said generator, and interlocking means between said switching means for preventing the closure of one until the other has been opened.

7. High frequency heating apparatus comprising a supporting structure, two upwardly movable work supports mounted on said structure in spaced relation with each other, article holding means for securing a plurality of articles to be heated in substantially vertical stacked relation midway between said work supports and arranged to provide for downward feeding movement of the stack of articles, a pusher movable back and forth between said work supports from one side to the other of said article holding means to engage and move the then lowermost one of said articles alternately onto said work supports, a first operating means for elevating each of said work supports, a second operating means for moving said pusher back and forth between said work supports, a high frequency heating means mounted above each of said work supports in position to heat an article on the respective work support when the work support is in a raised position, first limit switch means operated by said pusher when it is moved in each direction, second limit switch means operated by each of said work supports when moved to its raised position, power switching means for each of said heating means, and electric conductor connections between said limit switches, said operating means and said power switching means for controlling said operating means to effect the operation of said pusher back and forth, alternate elevation of said work supports, energization of said heating means for predetermined time intervals, and lowering of said work supports.

8. High frequency induction heating apparatus comprising a supporting structure provided with a substantially horizontal top forming a table, two upwardly movable work supports mounted on said structure in spaced relation with each other having their upper surfaces substantially flush with the top of said table, article holding means on said table for securing a plurality of articles to be heated in substantially vertical stacked relation midway between said work supports and arranged to provide for downward feeding movement of the stack of articles, a pusher movable on said table back and forth between said work supports from one side to the other of said article holding means to engage and push the then lowermost one of said articles alternately onto said work supports, a first operating means for elevating each of said work supports, a second operating means for moving said pusher back and forth between said work supports, a high frequency induction heating coil mounted above each of said work supports in position to heat an article on the respective work support when the work support is in a raised position, first limit switch means operated by said pusher when it is moved in each direction, second limit switch means operated by each of said work supports when moved to its raised position, power switching means for each of said heating coils, and electric conductor connections between said limit switches, said operating means and said power switching means for controlling said operating means to effect the operation of said pusher back and forth, alternate elevation of said work supports, energization of said coils for predetermined time intervals, and lowering of said work supports.

9. High frequency heating apparatus comprising a supporting structure, two upwardly movable work supports mounted on said structure in spaced relation with each other, article holding means for securing a plurality of articles to be heated in substantially vertical stacked relation midway between said work supports and arranged to provide for downward feeding movement of the stack of articles, a pusher movable back and forth between said work supports from one side to the other of said article holding means to engage and move the then lowermost one of said articles alternately onto said work supports, a first operating means for elevating each of said work supports, a second operating means for moving said pusher back and forth between said work supports, a high frequency heating means mounted above each of said work supports in position to heat an article on the respective work support when the work support is in a raised position, first limit switches operated alternately by said pusher when it is moved back and forth, electric connections between said first limit switches and said first operating means whereby when said pusher moves an article on one of said work supports said first operating means for said work upport is caused to raise said work support to bring the article into heating relation with the corresponding heating means, power supply switching means for each of said heating means, time mechanism for each of said heating means, second limit switches operated respectively by said work supports when each one is moved to its raised position for operating the corresponding one of said power supply switching means to supply power to the corresponding heating means and to start the corresponding time mechanism, switching means operated by said time mechanism after a predetermined interval for operating said power supply switching means to deenergize said heating means and for causing said first operating means to lower said work support, switching means controlled by said second limit switches when operated by said work support for causing said second operating means to move said pusher to its opposite position to move an article on the other work support, and interlocking means between said power supply switching means for preventing the closure of one until the other has been opened upon the completion of a heating operation.

10. High frequency induction heating apparatus comprising a supporting structure provided with a substantially horizontal top forming a table, two vertically movable work supports mounted on said structure in spaced relation with each other having their upper surfaces substantially flush with the top of said table, article holding means on said table for securing a plurality of articles to be heated in substantially vertical stacked relation midway between said work supports and arranged to provide for downward feeding movement of the stack of articles, a pusher movable on said table back and forth between said work supports from one side to the other of said article holding means to engage and push the then lowermost one of said articles alternately onto said work supports, a first operating means for elevating each of said work supports, a second operating means for moving said pusher back and forth between said work supports, a high frequency induction heating coil mounted above each of said work supports in position to heat an article on the respective work support when the work support is in a raised position, first limit switches operated alternately by said pusher when it is moved back and forth, electric connections between said first limit switches and said first operating means whereby when said pusher pushes an article on one of said work supports said first operating means for said work support is caused to raise said work support to bring the article into heating relation with the corresponding heating coil, power supply switching means for each of said heating coils, time mechanism for each of said heating coils, a second limit switch operated by each of said work supports when moved to its raised position for operating the corresponding one of said power supply switching means to supply power to the corresponding heating coil and to start the corresponding time mechanism, switching means operated by said time mechanism after a predetermined interval for operating said power supply switching means to deenergize said heating coil and for causing said first operating means to lower said work support, switching means controlled by said second limit switches when operated by said work support for causing said second operating means to move said pusher to its opposite position to push an article on the other work support, and mechanical interlocking means between said power supply switching means for preventing the closure of one until the other has been opened by its corresponding time mechanism upon the completion of a heating operation.

RALPH E. COX.

REFERENCES CITED

The following references are of record in the file of this patent:

UNITED STATES PATENTS

| Number | Name | Date |
|---|---|---|
| 1,702,985 | Twyman | Feb. 19, 1929 |
| 1,712,831 | Laurence | May 14, 1929 |
| 1,748,465 | Summey | Feb. 25, 1930 |
| 1,782,955 | Biggert | Nov. 25, 1930 |
| 2,277,564 | Somes | Mar. 24, 1942 |
| 2,361,517 | White et al. | Oct. 31, 1944 |
| 2,400,472 | Strickland | May 14, 1946 |
| 2,418,056 | Strickland | Mar. 25, 1947 |
| 2,422,417 | Hutchinson | June 17, 1947 |